United States Patent
Yang et al.

(10) Patent No.: US 12,236,666 B2
(45) Date of Patent: Feb. 25, 2025

(54) IMAGE PROCESSING CIRCUIT, SYSTEM-ON-CHIP INCLUDING THE SAME, AND METHOD OF ENHANCING IMAGE QUALITY

(71) Applicant: Samsung Electronics Co., Ltd., Suwon-si (KR)

(72) Inventors: Geunhee Yang, Hwaseong-si (KR); Donghoon Kim, Seongnam-si (KR); Maiyuran Wijay, San Diego, CA (US); Oleg Sergeyevich Khoruzhiy, San Diego, CA (US); Rama Mythili Vadali, Vista, CA (US); Song Ni, San Diego, CA (US); Dusic Yoo, Seoul (KR); Jaewon Yu, Yongin-si (KR); Seunghyung Lee, Yongin-si (KR); Venkata Rama Krishna Meka, Rajahmundry (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 410 days.

(21) Appl. No.: 17/695,142

(22) Filed: Mar. 15, 2022

(65) Prior Publication Data
US 2022/0335709 A1    Oct. 20, 2022

Related U.S. Application Data

(60) Provisional application No. 63/177,027, filed on Apr. 20, 2021.

(30) Foreign Application Priority Data

Aug. 18, 2021   (KR) .................. 10-2021-0108957

(51) Int. Cl.
*G06V 10/764*   (2022.01)
*G06N 3/08*   (2023.01)
(Continued)

(52) U.S. Cl.
CPC ............. *G06V 10/764* (2022.01); *G06N 3/08* (2013.01); *G06T 3/40* (2013.01); *G06T 5/70* (2024.01);
(Continued)

(58) Field of Classification Search
CPC .. G06V 10/764; G06V 10/267; G06V 10/774; G06V 20/00; G06V 10/82;
(Continued)

(56) References Cited

U.S. PATENT DOCUMENTS 7,889,949 B2   2/2011   Cohen et al.
8,417,033 B2   4/2013   Fan
(Continued)

FOREIGN PATENT DOCUMENTS

KR   10-2011-0091838 A   8/2011
KR   10-2021-0020618 A   2/2021
(Continued)

OTHER PUBLICATIONS

Extended European Search Report dated Sep. 30, 2022 for corresponding European Application No. 22166690.2.
(Continued)

*Primary Examiner* — Chan S Park
*Assistant Examiner* — Sebastian-Sy Vuchi Ngo
(74) *Attorney, Agent, or Firm* — Harness, Dickey & Pierce, P.L.C.

(57) ABSTRACT

Provided are an image processing circuit, a system-on-chip including the same, and a method of improving quality of a first image. The image processing circuit includes a tuning circuit configured to receive a segmentation map including pixel-by-pixel class inference information of the first image and a confidence map including confidence of the class inference information, determine classes of respective pixels of the first image, correction effects for each pixel of the (Continued)

image, and correction values indicating intensity of the correction effects based on the segmentation map and the confidence map, and generate a correction map based on the classes and the correction values of the respective pixels; and at least one correcting circuit configured to generate an enhanced image by applying correction effects according to the correction values to the respective pixels of the first image based on the correction map.

20 Claims, 15 Drawing Sheets

(51) Int. Cl.
G06T 3/40 (2024.01)
G06T 5/70 (2024.01)
G06T 5/73 (2024.01)
G06V 10/26 (2022.01)
G06V 10/774 (2022.01)
G06V 10/82 (2022.01)
G06V 20/00 (2022.01)

(52) U.S. Cl.
CPC .............. *G06T 5/73* (2024.01); *G06V 10/267* (2022.01); *G06V 10/774* (2022.01); *G06V 20/00* (2022.01); *G06T 2207/20081* (2013.01); *G06T 2207/20084* (2013.01); *G06V 10/82* (2022.01)

(58) Field of Classification Search
CPC .... G06T 3/40; G06T 5/70; G06T 5/73; G06T 2207/20081; G06T 2207/20084
See application file for complete search history.

(56) References Cited

U.S. PATENT DOCUMENTS

| 9,171,352 | B1 | 10/2015 | Raynaud et al. |
| 10,636,123 | B2 | 4/2020 | Krishnapura Subbaraya et al. |
| 10,929,665 | B2 | 2/2021 | Liu et al. |
| 11,049,217 | B2* | 6/2021 | Wang .................... G06F 18/217 |
| 2008/0298704 | A1 | 12/2008 | Nachlieli et al. |
| 2011/0002506 | A1 | 1/2011 | Ciuc et al. |
| 2014/0010448 | A1 | 1/2014 | Lischinski et al. |
| 2016/0035069 | A1 | 2/2016 | Min et al. |
| 2017/0289405 | A1* | 10/2017 | Agrawal ................... G06T 5/90 |
| 2019/0287292 | A1* | 9/2019 | Ceccaldi ................ G06N 3/045 |
| 2020/0302656 | A1* | 9/2020 | Kumar ...................... G06T 7/90 |
| 2021/0118097 | A1 | 4/2021 | Guan et al. |
| 2021/0158100 | A1* | 5/2021 | Kamon ............. G06V 10/7753 |
| 2021/0342974 | A1* | 11/2021 | Zhang ................... G06T 3/4046 |

FOREIGN PATENT DOCUMENTS

| KR | 102214465 B1 | 2/2021 |
| KR | 10-2021-0034462 A | 3/2021 |
| KR | 102223754 B1 | 3/2021 |
| KR | 102233444 B1 | 3/2021 |

OTHER PUBLICATIONS

M. M. Memon et al., "Novel Content Aware Pixel Abstraction for Image Semantic Segmentation," Journal of Hunan University (Natural Sciences), vol. 47, No. 9, Sep. 2020.

L. Kaufman et al., "Content-Aware Automatic Photo Enhancement," Computer Graphics Forum, vol. xx (200y), No. z, pp. 1-12, Mar. 2012.

Screen captures from YouTube video clip entitled, "Exynos 2100: Exynos on Official Replay | Samsung" uploaded on Jan. 12, 2021 by Samsung. Retrieved from internet: (https://youtu.be/qcBqg6Y_cnw).

J. Kopf et al., "Joint Bilateral Upsampling," ACM Transactions on Graphics 26 (3):96, Jul. 2007.

* cited by examiner

FIG. 4
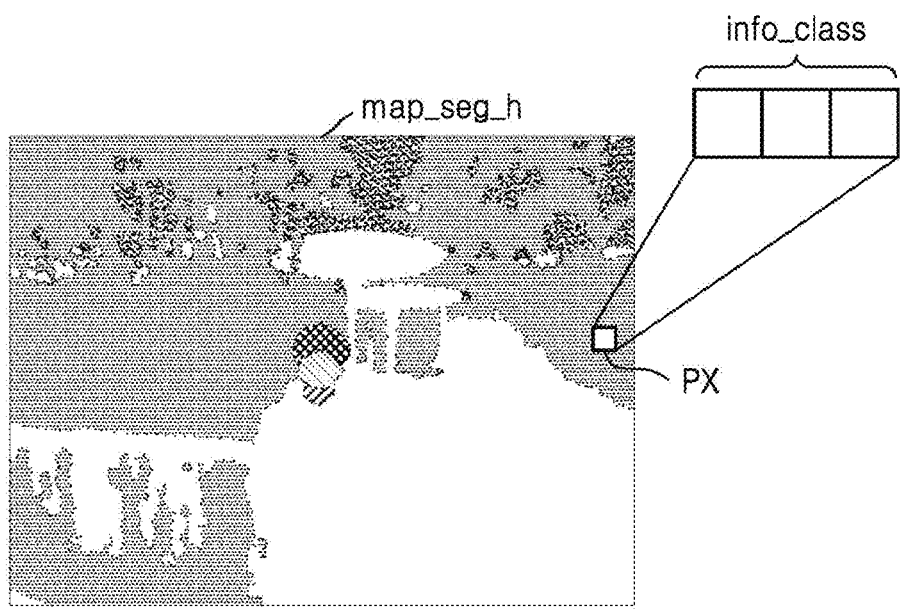
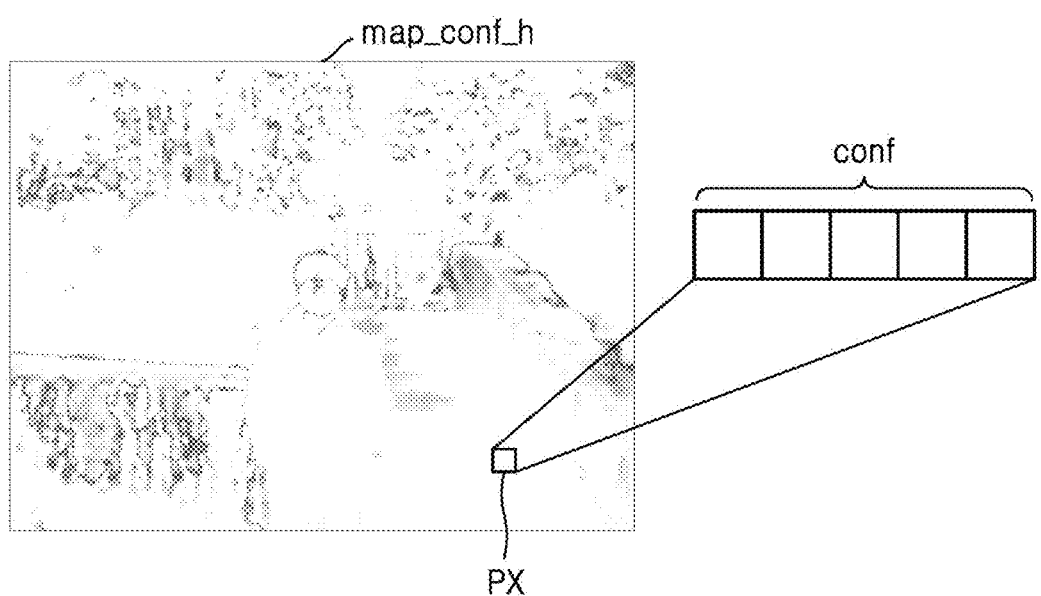

FIG. 8

|  | confidence | denoise | color correction | sharpen |
|---|---|---|---|---|
| | 0 | d1 | c1 | s1 |
| | 0.25 | d2 | c2 | s2 |
| class1 | 0.5 | d3 | c3 | s3 |
| | 0.75 | d4 | c4 | s4 |
| | 1 | d5 | c5 | s5 |

141

IMAGE PROCESSING CIRCUIT, SYSTEM-ON-CHIP INCLUDING THE SAME, AND METHOD OF ENHANCING IMAGE QUALITY

CROSS-REFERENCE TO RELATED APPLICATIONS

This application is based on and claims priority under 35 U.S.C. § 119 to U.S. Provisional Application No. 63/177,027, filed on Apr. 20, 2021, in the Unites States Patent and Trademark Office, and Korean Patent Application No. 10-2021-0108957, filed on Aug. 18, 2021, in the Korean Intellectual Property Office, the disclosures of which are incorporated by reference herein in their entireties.

BACKGROUND

The inventive concepts relate to image processing, and more particularly, to an image processing circuit, a system-on-chip including the same, and a method of enhancing image quality.

Images may be obtained through various devices. For example, an image may be captured by using a built-in camera of a smartphone, and a captured image may be corrected.

Algorithms for correcting an image may vary. As a representative example, a method of determining one scene that may represent an entire image and correcting an overall tone and/or color of an image to emphasize the scene may be used.

However, objects having various characteristics may be in one image. When uniform correction is performed on an entire image without distinguishing the characteristics of objects in the image, it is difficult to obtain an evenly corrected image.

SUMMARY

Example embodiments provide image processing circuits for performing pixel-by-pixel correction of an image, a system-on-chip (SoC) including the same, and a method of improving quality of an image.

According to an example embodiment, an image processing circuit may include a tuning circuit configured to receive a segmentation map including pixel-by-pixel class inference information of a first image and a confidence map including confidence of the class inference information, determine classes of respective pixels of the first image, correction effects for each pixel of the first image, and correction values indicating intensity of the correction effects based on the segmentation map and the confidence map, and generate a correction map based on the classes and the correction values of the respective pixels; and at least one correcting circuit configured to generate an enhanced image by applying correction effects according to the correction values to the respective pixels of the first image based on the correction map.

According to another example embodiment, a method of improving quality of a first image may include receiving the first image; generating first class inference information by inferring classes to which respective pixels of the first image belong by using a trained neural network model and calculating a first confidence for the first class inference information; determining a first correction effect to be applied to each pixel of the first image and a first correction value based on a table in which correction values are determined according to classes and confidences; and generating an enhanced image by applying the first correction effect to each pixel as much as the first correction value.

According to another example embodiment, a system-on-chip (SoC) for generating an enhanced image by correcting a first image may include a first circuit configured to generate first class inference information for each pixel of the first image and a first confidence for the first class inference information by using a trained neural network model; and a second circuit configured to determine correction values for respective pixels of the first image based on the first class inference information and the first confidence and generate the enhanced image by applying correction effects corresponding to the correction values to the respective pixels of the first image.

According to example embodiment, a system-on-chip (SoC) for correcting a first image may include a segmentation circuit configured to receive the first image and generate a segmentation map including class inference information corresponding to each pixel of the first image and a confidence map including confidence for the class inference information by using a trained neural network model; and an image processing circuit configured to generate a correction map by determining correction effects to be applied to each pixel of the first image based on the segmentation map and the confidence map and apply the correction effects to the first image based on the correction map.

BRIEF DESCRIPTION OF THE DRAWINGS

Example embodiments will be more clearly understood from the following detailed description taken in conjunction with the accompanying drawings in which:

FIG. 4 is a diagram showing examples of a segmentation map and a confidence map according to an example embodiment;

FIG. 8 is a diagram showing an example of a part of a setting value table according to an example embodiment;

DETAILED DESCRIPTION OF THE EMBODIMENTS

Figure 1:
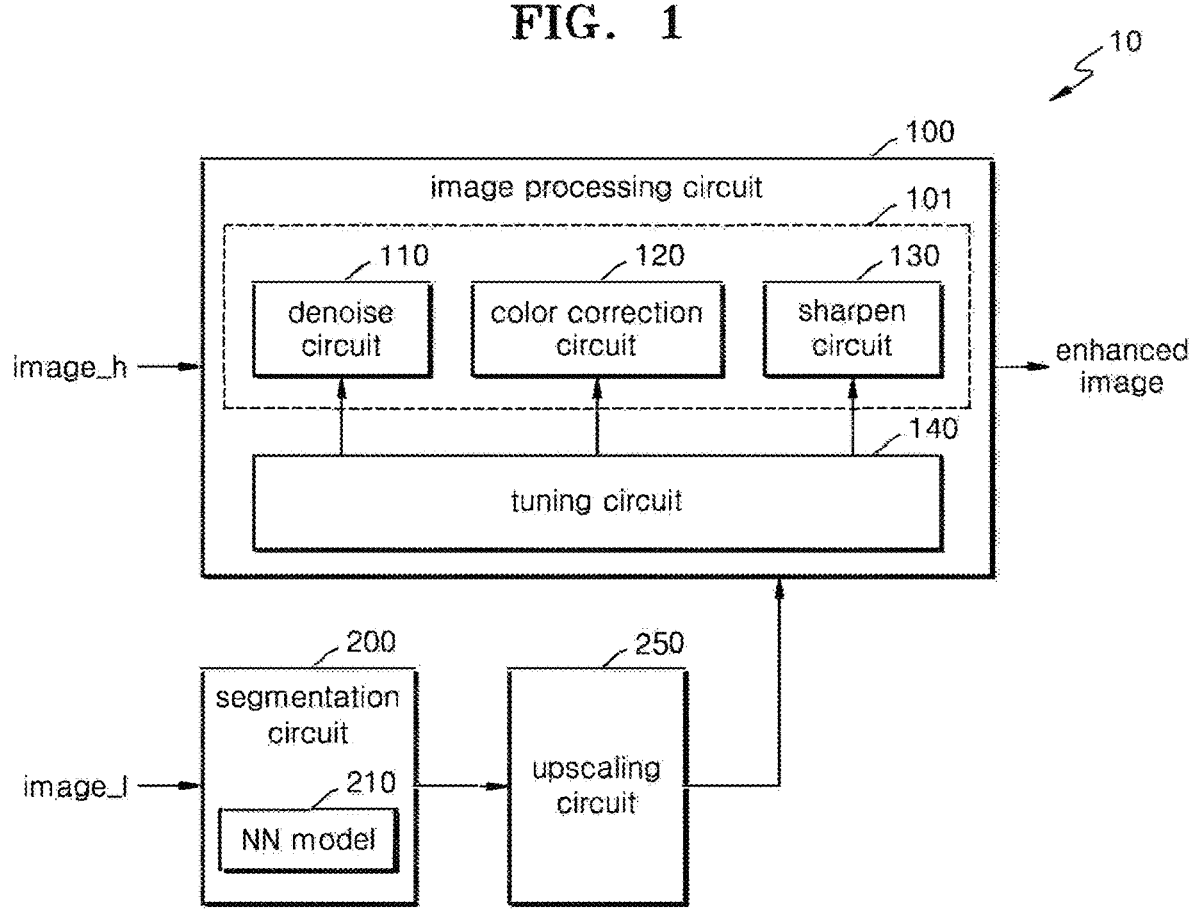
FIG. 1 is a block diagram showing an image processing system according to an example embodiment.

FIG. 1 is a block diagram showing an image processing system according to an example embodiment.

Referring to FIG. 1, an image processing system 10 may include a plurality of circuits for outputting an enhanced image by correcting an image image_h (first image). The image image_h may be generated by an image signal processor (ISP). For example, the image image_h may correspond to a still image or one frame of a moving picture including a plurality of frames.

According to an example embodiment, the image processing system 10 may include an image processing circuit 100, a segmentation circuit 200, and/or an upscaling circuit 250. The image processing circuit 100, the segmentation circuit 200, and the upscaling circuit 250 may each be embodied by hardware, software (or firmware), or a combination of hardware and software to implement the inventive concepts. Also, although not shown, the image processing system 10 may further include an encoder for encoding an enhanced image.

The segmentation circuit 200 may receive an image and perform a segmentation operation of dividing the image into a plurality of regions by using a trained neural network model 210. For example, the segmentation circuit 200 may infer a class corresponding to each of a plurality of pixels in the image. According to an embodiment, the segmentation circuit 200 may form a segmentation map by inferring a class corresponding to each pixel. According to an embodiment, pixels corresponding to the same class inference information may form a region.

Also, the segmentation circuit 200 may calculate the confidence of the inferred class for each pixel. According to an embodiment, the confidence may be formed in the form of a confidence map. According to an embodiment, the size of a segmentation map and the size of a confidence map may each be the same as the size of the image.

According to an embodiment, the segmentation circuit 200 may receive a low-resolution image image_l, which is a reduced image of an image image_h to be corrected. Restated, the low-resolution image may be a lower resolution version of the first image. The low-resolution image image_l may have a smaller size than the image image_h. The segmentation circuit 200 may generate a low-resolution segmentation map and a low-resolution confidence map for the low-resolution image image_l by using the neural network model 210. In this case, the size of the low-resolution segmentation map and the size of the low-resolution confidence map may each be the same as the size of the low-resolution image image_l. Hereinafter, the neural network model 210 will be described in greater detail with reference to FIG. 2.

The upscaling circuit 250 may receive the low-resolution segmentation map and the low-resolution confidence map from the segmentation circuit 200 and generate a segmentation map and a confidence map each having the same size as the image image_h by interpolating and enlarging each in correspondence to the size of the image image_h.

The image processing circuit 100 may receive the image image_h, perform a series of processes for improving the image quality of the image image_h or correcting the image image_h, and generate an enhanced image as a result thereof. The image processing circuit 100 may receive the image image_h and the segmentation map and the confidence map for the image image_h.

The image processing circuit 100 may include a tuning circuit 140 and at least one correcting circuit 101.

The tuning circuit 140 may determine correction effects to be applied to each pixel of the image image_h and the intensity of the correction effects based on the segmentation map and the confidence map. Hereinafter, for convenience of explanation, the intensity of a correction effect may be referred to as a correction value. To apply at least one correction effect to each pixel, the tuning circuit 140 may generate correction maps corresponding to respective correction effects and provide the correction maps to the at least one correcting circuit 101.

The at least one correcting circuit 101 may receive the correction maps from the tuning circuit 140 and apply correction effects to the respective pixels of the image image_h. According to an embodiment, the at least one correcting circuit 101 may apply a correction effect to a plurality of pixels to which the same correction effect is to be applied.

According to an embodiment, the at least one correcting circuit 101 may include a denoise circuit 110, a color correction circuit 120, and a sharpen circuit 130. The denoise circuit 110 may reduce noise of at least one pixel, the color correction circuit 120 may adjust the color value of at least one pixel, and the sharpen circuit 130 may increase the sharpness of at least one pixel. The at least one correcting circuit 101 may further include a circuit providing various types of correction effects, and the at least one correcting circuit 101 may each be implemented by hardware, software (or firmware), or a combination of hardware and software.

According to an embodiment, the image processing circuit 100 may perform correction region-by-region on regions each including pixels that are classified into the same class. For example, to apply a first correction effect on a first region including pixels that are classified into a first class, the image processing circuit 100 may use at least one of the denoise circuit 110 that reduces the noise of the first region, the color correction circuit 120 that adjusts the color value of the first region, and the sharpen circuit 130 that increases the sharpness of the first region. At this time, the image processing circuit 100 may use a confidence map to adjust the intensity of a correction effect applied to a first pixel or the first region including the first pixel.

The image processing circuit 100 according to example embodiments may determine and apply a correction effect to be applied to each of a plurality of pixels in the image image_h. In other words, by applying correction effects pixel-by-pixel, fine correction may be performed, and thus, an image with improved image quality may be obtained.

Also, by performing segmentation and correction pixel-by-pixel on the image image_h in which pixels of different classes are complexly arranged, accurate corrections corresponding to the respective pixels may be performed as compared to corrections region-by-region, thereby improving user satisfaction.

Figure 2:
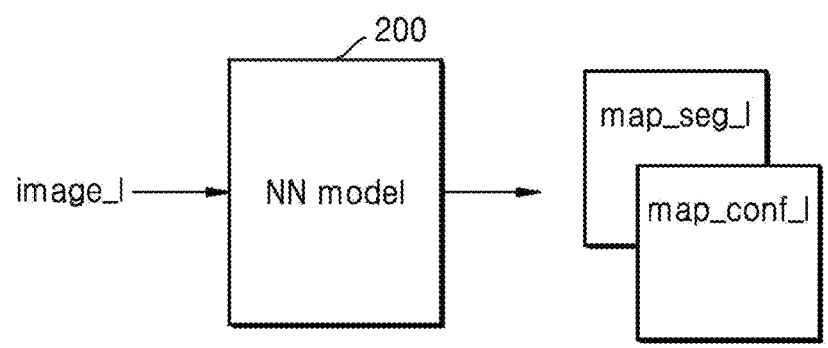
FIG. 2 is a block diagram showing a neural network model according to an example embodiment.

FIG. 2 is a block diagram showing a neural network model according to an example embodiment.

Referring to FIG. 2, the segmentation circuit 200 may receive the low-resolution image image_l, which is generated by reducing the image image_h, from an ISP. The segmentation circuit 200 may input the low-resolution image image_l to the neural network model 210 and obtain a low-resolution segmentation map map_seg_l and a low-resolution confidence map map_conf_l as outputs. The segmentation circuit 200 may provide the low-resolution segmentation map map_seg_l and the low-resolution confidence map map_conf_l to the upscaling circuit 250.

The low-resolution segmentation map map_seg_l may include class inference information for each pixel of the low-resolution image image_l. The low-resolution confidence map map_conf_l may include confidence of class inference information for each pixel of the low-resolution image image_l. For example, a second pixel of the low-resolution segmentation map map_seg_l and a third pixel of the low-resolution confidence map map_conf_l may each correspond to the first pixel of the low-resolution image image_l. In this case, the second pixel of the low-resolution segmentation map map_seg_l may indicate class inference information for the first pixel, and the third pixel of the low-resolution confidence map map_conf_l may indicate the probability and/or confidence of the corresponding class inference information.

The segmentation circuit 200 may include the neural network model 210 of which training is completed. The neural network model 210 may learn relationships between a plurality of classes defined to have different correction effects and pixels. In this case, the classes may have different weights for at least one of a denoise effect, a color correction effect, and a sharpening effect.

The neural network model 210 may be trained off-line. According to an embodiment, the neural network model 210 may be generated by being trained in a training device, e.g., a server that trains a neural network based on a large amount of learning data. According to an embodiment, the neural network model 210 may use an arbitrary pixel and a class labeled in correspondence to the arbitrary pixel as training data. For example, a training image and classes labeled for respective pixels of the training image may be used as training data.

Hereinafter, in the present specification, descriptions will be given under an assumption that parameters (e.g., network topology, bias, weight, etc.) of the neural network model 210 are already determined through training. However, the inventive concepts are not limited thereto.

For example, the neural network model 210 may include at least one of various types of neural network models like a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep relief network (DBN), a restricted Boltzmann machine (RBM), a fully convolutional network, a long short-term memory (LSTM) network, and a classification network.

Figure 3:
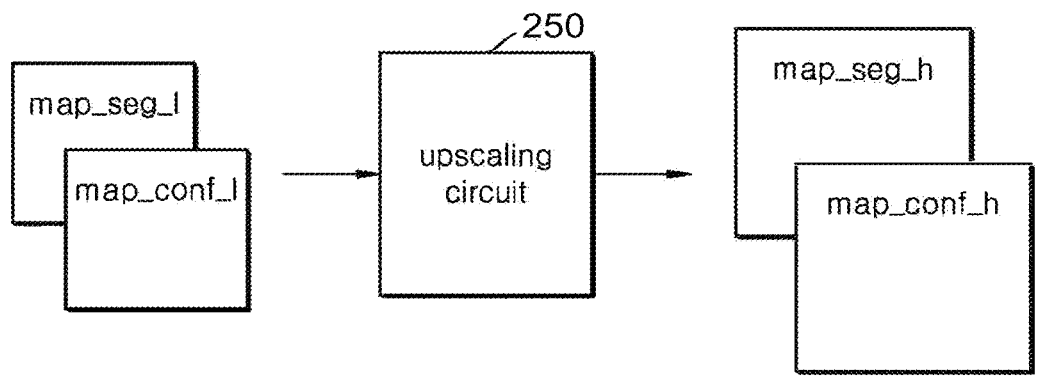
FIG. 3 is a block diagram showing an upscaling circuit according to an example embodiment.

FIG. 3 is a block diagram showing an upscaling circuit according to an example embodiment.

Referring to FIG. 3, the upscaling circuit 250 may generate a segmentation map map_seg_h and a confidence map map_conf_h by enlarging and/or interpolating the low-resolution segmentation map map_seg_l and the low-resolution confidence map map_conf_l. The size of each of the segmentation map map_seg_h and the confidence map map_conf_h generated by the upscaling circuit 250 may be the same as the size of the image image_h in FIG. 1.

The upscaling circuit 250 may use various algorithms to perform scaling and/or interpolation. For example, the upscaling circuit 250 may convolve a low quality or low-resolution image through an interpolation kernel and resample a convolved image in a new grid. For example, the upscaling circuit 250 may use a linear interpolation filter and may apply a joint bilateral filter to keep edges sharp. However, the inventive concepts are not limited thereto.

The upscaling circuit 250 may provide the segmentation map map_seg_h and the confidence map map_conf_h to an image processing circuit (e.g., 100 of FIG. 1).

FIG. 4 is a diagram showing examples of a segmentation map and a confidence map according to an example embodiment.

Referring to FIGS. 1 and 4 together, the segmentation map map_seg_h may include a plurality of pixels px, and each pixel px may include class inference information info_class. In other words, each pixel px of the segmentation map map_seg_h may include class inference information info_class of a corresponding pixel of the image image_h. According to an embodiment, the class inference information info_class may include n (n is a natural number; e.g., n is 3) bits, but the inventive concepts are not limited thereto. For example, when the type of class inference information info_class output from a neural network model increases, the number of bits representing the class inference information info_class may increase. Restated, each pixel of the segmentation map may include a value with n bits.

The confidence map map_conf_h may include a plurality of pixels px, and each pixel px may include confidence conf. Each pixel px of the confidence map map_conf_h may correspond to a pixel of the segmentation map map_seg_h and a pixel of the image image_h. Each pixel px of the confidence map map_conf_h may include confidence conf of the class inference information info_class of a corresponding pixel of the image image_h. According to an example embodiment, the reliability conf may include m (m is a natural number greater than n; e.g., m is 5) bits, but the inventive concepts are not limited thereto. Restated, each pixel of the confidence map may include a value with m bits, where a value of m is greater than a value of n.

Figure 5:
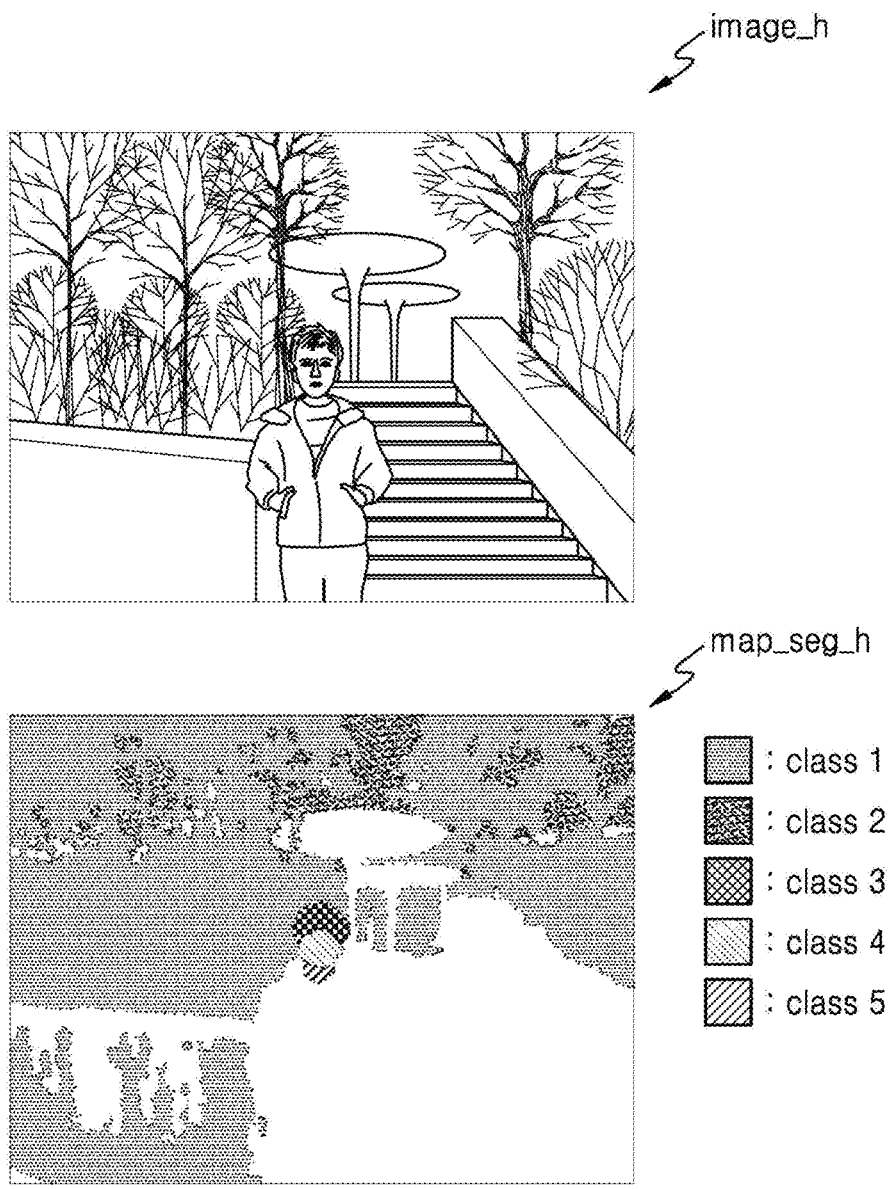
FIG. 5 is a diagram showing an example of a segmentation map according to an example embodiment.

FIG. 5 is a diagram showing an example of a segmentation map according to an example embodiment.

Referring to FIG. 5, the position of each pixel in the segmentation map map_seg_h may correspond to the position of a corresponding pixel in the image image_h, and the value of each pixel in the segmentation map map_seg_h may indicate a class to which a corresponding pixel of the image image_h is inferred.

For example, in the image image_h, a portion corresponding to a branch may be inferred as a first class class1, a portion corresponding to the sky may be inferred as a second class class2, a portion corresponding to the human hair may be inferred as a third class class3, a portion corresponding to the human face may be inferred as a fourth class class4, and a portion corresponding to the human skin may be inferred as a fifth class class5.

According to an example embodiment, pixels of the image image_h may be segmented considering correction effects to be applied to the respective pixels of the image image_h. In other words, pixels to which different correction effects need to be applied may be segmented into different classes.

Also, according to an example embodiment, because segmentation is performed pixel-by-pixel, the accuracy of segmentation may be improved even in a detailed and complex image image_h including objects like hair and tree branches.

Figure 6:
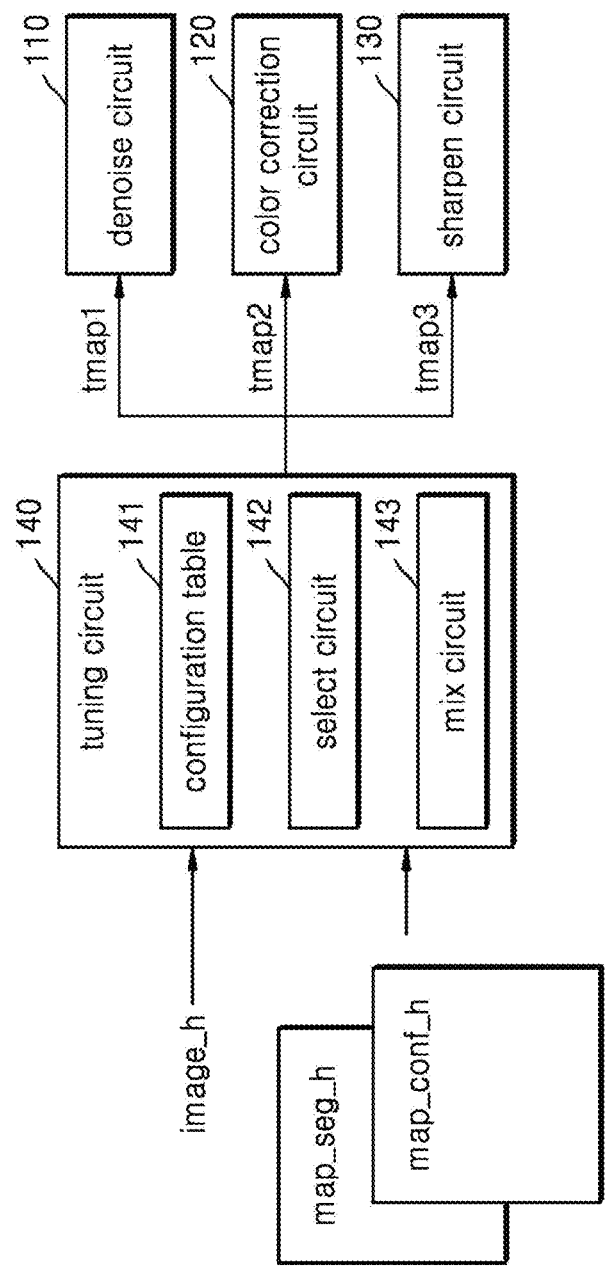
FIG. 6 is a diagram showing an example of an operation of a tuning circuit according to an example embodiment.

FIG. 6 is a diagram showing an example of an operation of a tuning circuit according to an example embodiment.

Referring to FIG. 6, the tuning circuit 140 may receive the image image_h from the outside and may receive the segmentation map map_seg_h and the confidence map map_conf_h from the upscaling circuit 250 of FIG. 1. For example, the image image_h may be generated within an image processing circuit (e.g., 100 of FIG. 1) through an image sensor.

The tuning circuit 140 may include a configuration table 141, a select circuit 142, and a mix circuit 143. The select circuit 142 and the mix circuit 143 may each be implemented by hardware, software (or firmware), or a combination of hardware and software.

The configuration table 141 may include class inference information that each of the pixels of the segmentation map map_seg_h indicates and correction effects to be applied according to confidence that each pixel of the confidence map map_conf_h indicates. For example, the configuration table 141 may include correction values indicating the intensity of correction effects.

According to an embodiment, a pixel of the segmentation map map_seg_h corresponding to an arbitrary pixel of the image image_h may represent a first class, and a pixel of the confidence map map_conf_h corresponding to the arbitrary pixel of the image image_h may represent a first value. In this case, when the first class has the first value and is inferred, the configuration table 141 may include correction effects to be applied to the arbitrary pixel and a correction value to be applied to the arbitrary pixel. For example, when an arbitrary pixel is determined as the first class having a first confidence, the configuration table 141 may apply a first correction effect to the arbitrary pixel as much as a first correction value and apply a second correction effect to the arbitrary pixel as much as a second correction value.

In the present specification, although it is described that the configuration table 141 is determined in advance in correspondence to at least one correcting circuit, the inventive concepts are not limited thereto, and information included in the configuration table 141 may be changed.

The select circuit 142 may determine the class of each pixel of the image image_h based on the segmentation map map_seg_h, the confidence map map_conf_h, and a pre-set threshold value. For example, the select circuit 142 may determine the class of each pixel of the image image_h based on the class inference information and the confidence for each pixel. In this case, the select circuit 142 may include class information and a pre-set threshold value. The class information may include types of classes to which each pixel may be classified into.

A case in which an arbitrary pixel is inferred as a first class according to the segmentation map map_seg_h and inference confidence of the arbitrary pixel corresponds to a first value according to the confidence map map_conf_h will be described as an example. A threshold needed to be determined as the first class may be a first threshold. The select circuit 142 may compare the first threshold value for determining the arbitrary pixel as the first class according to an inference result with a first value. The select circuit 142 may determine the class of the arbitrary pixel as the first class as the first value exceeds (or equal to or greater than) the first threshold value.

The class of each of a plurality of pixels in the image image_h may be determined by the select circuit 142. Even when any two pixels are of the same class, correction effects to be applied thereto may be different according to the confidence of each of the two pixels. In this case, the mix circuit 143 may determine the intensity of correction effects to be applied to each of the pixels, that is, correction values, in consideration of confidence.

The mix circuit 143 may generate first to third correction maps tmap1, tmap2, and tmap3 corresponding to respective correction effects by taking into account the confidence map map_conf_h based on the classes of respective pixels determined by the select circuit 142. The size of each of the first to third correction maps tmap1, tmap2, and tmap3 may be the same as the size of the image image_h. Pixels of the first to third correction maps tmap1, tmap2, and tmap3 may represent correction values to be applied to the respective pixels in the image image_h.

According to an embodiment, the mix circuit 143 may generate a first correction map tmap1 including correction values for the denoise effect, a second correction map tmap2 including correction values for the color correction effect, and a third correction map tmap3 including correction values for the sharpening effect. The mix circuit 143 may provide the first to third correction maps tmap1, tmap2, and tmap3 to the denoise circuit 110, the color correction circuit 120, and the sharpen circuit 130, respectively.

Although it is shown in FIG. 6 that three correction maps, that is, the first to third correction maps tmap1, tmap2, and tmap3, are generated, the inventive concepts are not limited thereto, and the mix circuit 143 may generate as many correction maps as the number of the denoise circuit 110, the color correction circuit 120, and the sharpen circuit 130.

Figure 7:
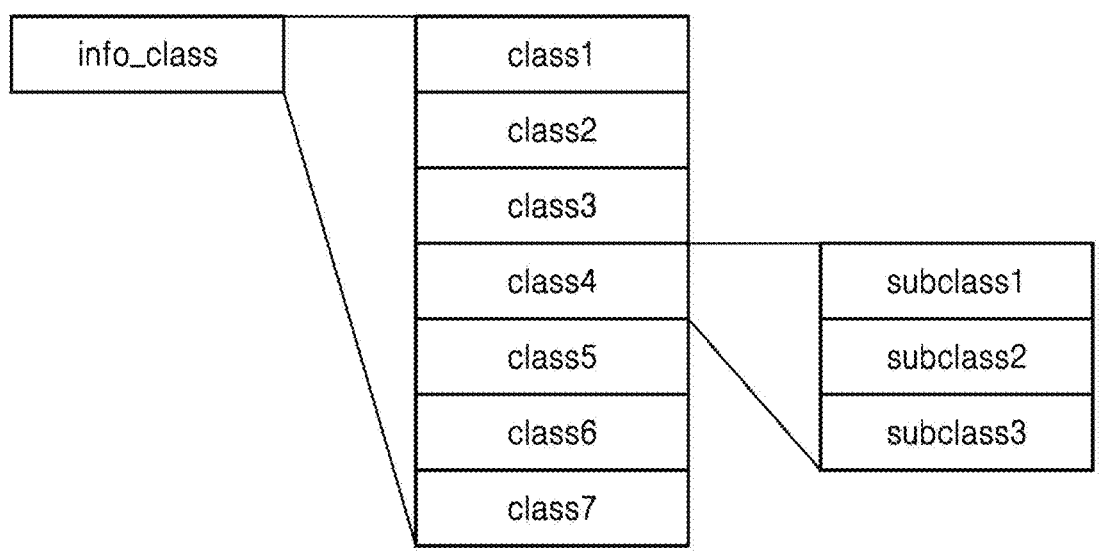
FIG. 7 is a diagram showing an example of class information according to an example embodiment.

FIG. 7 is a diagram showing an example of class information according to an example embodiment.

Referring to FIG. 7, class information info_class may be included in a tuning circuit (e.g., 140 of FIG. 6). The class information info_class may include a plurality of classes into which pixels of an image may be classified.

Classes and/or subclasses may be generated based on correction effects. In other words, pixels to which the same correction effect is to be applied may be classified into the same class, and pixels to which different correction effects are to be applied may be classified into different classes. However, the inventive concepts are not limited thereto, and classes and/or subclasses may be generated based on characteristics of pixels, e.g., color information.

According to an embodiment, one class may include at least one subclass. According to an embodiment, the class information info_class may include first to seventh classes class1 to class7, and a fourth class class4 may include first to third subclasses subclass1 to subclass3. For example, the first to seventh classes class1 to class7 may correspond to a face class, a skin class, a sky class, a detail class, an eye class, an eyebrow class, and a hair class, respectively. In this case, the detail class may include a grass subclass, a sand subclass, and a branch subclass. However, the types and numbers of classes and subclasses are not limited thereto and may be changed. The classes and subclasses may be applied in the segmentation map. Each pixel of the segmentation map may include least one of a face class, a skin class, a sky class, a detail class, an eye class, an eyebrow class, and a hair class.

FIG. 8 is a diagram showing an example of a part of a setting value table according to an example embodiment.

Referring to FIGS. 6 and 8 together, the configuration table 141 may include correction values according to confidence for a plurality of correction effects. Hereinafter, description will be given based on an example of one class, but the description may be similarly applied to other classes.

For example, the select circuit 142 of the tuning circuit 140 may determine an arbitrary pixel in the image image_h as the first class class1. At this time, the mix circuit 143 may determine a correction value according to the confidence of the arbitrary pixel by referring to the confidence map map_conf_h for the image image_h.

For example, when the confidence of the first class class1 is 0.25, the mix circuit 143 may determine to apply a denoise effect by d2, a color correction effect by c2, and a sharpening effect by s2 to the arbitrary pixel. Therefore, in the first correction map tmap1 for the denoise effect, a pixel value corresponding to the arbitrary pixel may be determined as d2, in the second correction map tmap2 for the color correction effect, a pixel value corresponding to the arbitrary pixel may be determined as c2, and, in the third correction map tmap3 for the sharpening effect, a pixel value corresponding to the arbitrary pixel may be determined as s2. In other words, the mix circuit 143 generates the first correction map tmap1 including d2, the second correction map tmap2 including c2, and the third correction map tmap3 including s2.

According to an example embodiment of the present disclosure, because correction effects and the correction values are determined pixel-by-pixel, even in the image image_h including complex shapes, correction according to the characteristics of each pixel may be performed. Therefore, it may be helpful to improve the image quality of the image image_h including complex shapes.

Figure 9:
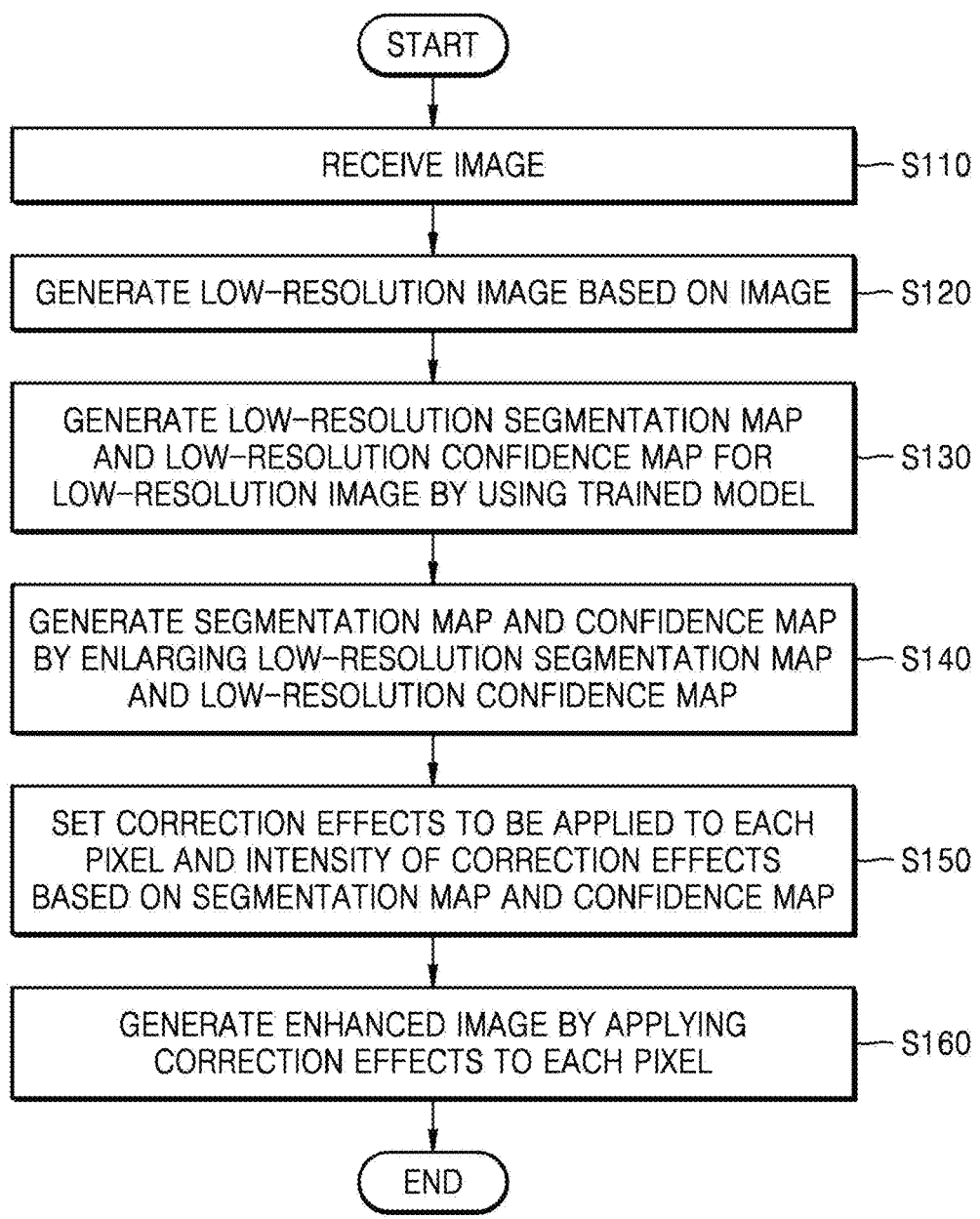
FIG. 9 is a flowchart showing an operation of an image processing system according to an example embodiment.

FIG. 9 is a flowchart showing an operation of an image processing system according to an example embodiment.

Referring to FIGS. 1, 6, and 9 together, an operation of receiving an image image_h may be performed (operation S110). For example, the image processing system 10 may obtain the image image_h from an image sensor.

An operation of generating a low-resolution image image_l based on the received image image_h may be performed (operation S120).

By using the trained neural network model 210, a low-resolution segmentation map map_seg_l and a low-resolution confidence map map_conf_l for the low-resolution image image_l may be generated (operation S130). According to an embodiment, the neural network model 210 may be trained by using a training image and correct answer classes labeled to respective pixels of the training image as training data. At this time, the correct answer classes may correspond to correction effects to be applied to the respective pixels of the training image. According to an embodiment, classes to which the respective pixels of the low-resolution image image_l belong may be inferred by the neural network model 210, and confidence of an inferred class may be calculated for each pixel. In some embodiments, the neural network model 210 may include organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

By enlarging the low-resolution segmentation map map_seg_l and the low-resolution confidence map map_conf_l, the segmentation map map_seg_h and the confidence map map_conf_h for the image image_h may be generated (operation S140).

Based on the segmentation map map_seg_h and the confidence map map_conf_h, correction effects to be applied to each pixel of the image image_h and the intensity of the correction effects, that is, a correction value, may be determined (operation S150). According to an embodiment, the first to third correction maps tmap1, tmap2, and tmap3 may be generated for the respective correction effects. The first to third correction maps tmap1, tmap2, and tmap3 may include correction values and may each have the same size as the image image_h.

An enhanced image may be generated by applying correction effects corresponding to the correction values to the respective pixels (operation S160). According to an embodiment, the denoise circuit 110, the color correction circuit 120, and the sharpen circuit 130 may apply correction effects to the respective pixels of the image image_h based on the first to third correction maps tmap1, tmap2, and tmap3. In this case, the enhanced image may correspond to the image image_h with an improved image quality. The enhanced image may be stored in a memory, transmitted to another device, displayed on a display or otherwise transferred, stored or used.

Thereafter, the enhanced image is provided to an encoder and an operation of compressing the enhanced image in various formats may be further performed.

Figure 10:
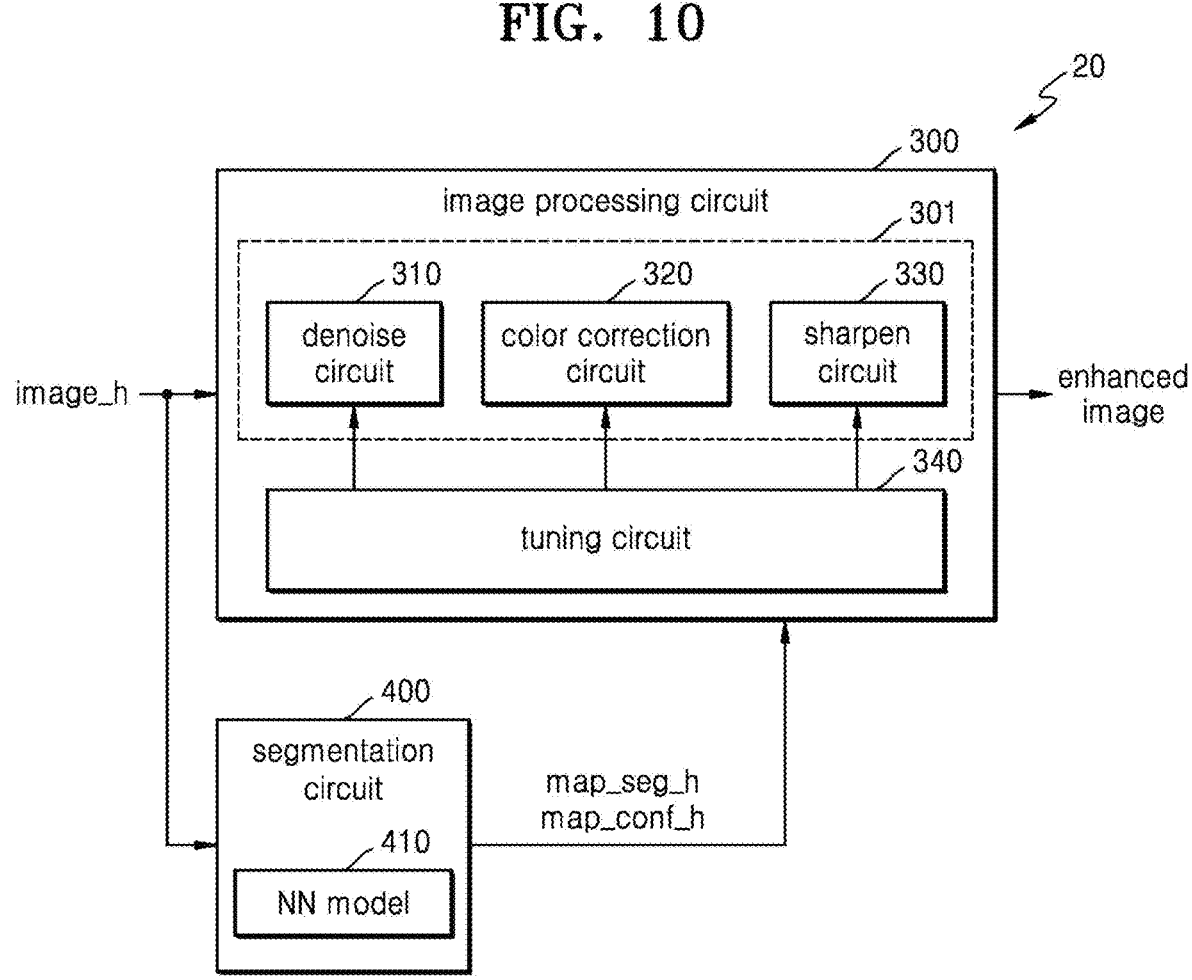
FIG. 10 is a block diagram showing an image processing system according to an example embodiment.

FIG. 10 is a block diagram showing an image processing system according to an example embodiment. Since an image processing system 20 of FIG. 10 is similar to the image processing system 10 of FIG. 1, descriptions identical to those already given above will be omitted. For example, the image processing circuit 300 may be substantially similar to the image processing circuit 100. The at least one correcting circuit 301 may be substantially the same as the at least one correcting circuit 101. The denoise circuit 310 may be substantially the same as the denoise circuit 110. The color correction circuit 320 may be substantially the same as the color correction circuit 120. The sharpen circuit 330 may be substantially the same as the sharpen circuit 130. The tuning circuit 340 may be substantially the same as the tuning circuit 140.

Unlike the image processing system 10 of FIG. 1, in the image processing system 20 of FIG. 10, the upscaling circuit (250 of FIG. 1) may be omitted. Therefore, a segmentation circuit 400 may receive an image image_h and generate a segmentation map map_seg_h and a confidence map map_conf_h for the image image_h by using a trained neural network model 410.

According to an embodiment, an image processing circuit 300 may be referred to as a first circuit or as a first portion of the first circuit, and the segmentation circuit 400 may be referred to as a second circuit. The image processing system 10 of FIG. 1 may further include the upscaling circuit (250 of FIG. 1; e.g., a third circuit or a second portion of the first circuit) as compared to the image processing system 20 of FIG. 10.

According to an embodiment, the second circuit may generate first class inference information for each pixel of the image image_h and a first confidence for the first class inference information by using the trained neural network model 410. The first circuit may determine a correction value for each pixel of the image image_h based on the first class inference information and the first confidence and apply correction effects corresponding to the correction values to the respective pixel of the image image_h, thereby generating an enhanced image. Here, when a third circuit is further included as in the image processing system 10 of FIG. 1, the second circuit may receive a low-resolution image and generate second class inference information and a second confidence for each pixel of the low-resolution image by using the neural network model 410. The third circuit may generate the first class inference information and the first confidence based on the second class inference information and the second confidence. The first circuit may be configured to generate the first class inference information and the first confidence via the third circuit.

The segmentation circuit 400 may provide the segmentation map map_seg_h and the confidence map map_conf_h to a tuning circuit 340 of the image processing circuit 300. The image processing circuit 300 may perform pixel-by-pixel correction operations on the image image_h based on the segmentation map map_seg_h and the confidence map map_conf_h.

Figure 11:
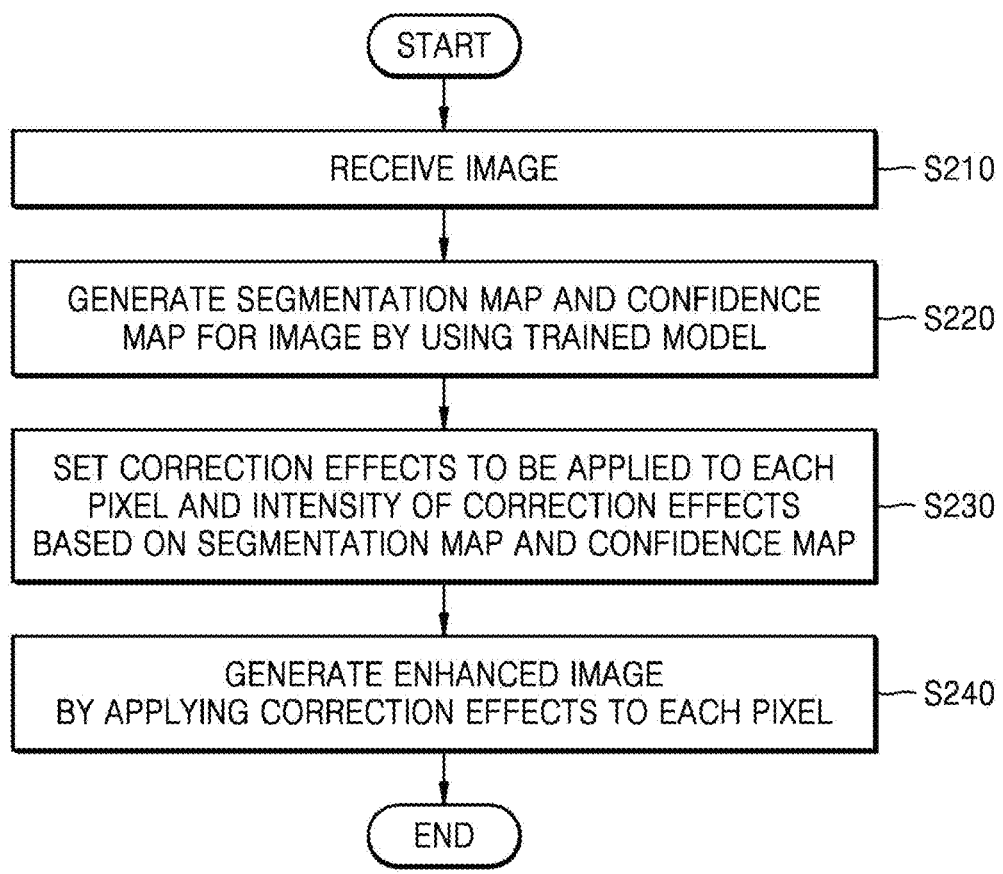
FIG. 11 is a flowchart showing an operation of an image processing system according to an example embodiment.

FIG. 11 is a flowchart showing an operation of an image processing system according to an example embodiment.

Referring to FIGS. 10 and 11 together, an operation of receiving an image image_h may be performed (operation S210). For example, the image processing system 20 may obtain the image image_h from an image sensor. The image processing circuit 300 and the segmentation circuit 400 may receive the image image_h.

The segmentation map map_seg_h and the confidence map map_conf_h for the image image_h may be generated by using the trained neural network model 410 (operation S220). According to an embodiment, the segmentation circuit 400 may infer a class to which each pixel of the image image_h belongs by using the neural network model 410 and may calculate the confidence of the class inferred for each pixel.

Based on the segmentation map map_seg_h and the confidence map map_conf_h, correction effects to be applied to each pixel of the image image_h and the intensity of the correction effects, that is, a correction value, may be determined (operation S230). An enhanced image may be generated by applying correction effects corresponding to the correction values to the respective pixels (operation S240).

Thereafter, the enhanced image is provided to an encoder and an operation of compressing the enhanced image in various formats may be further performed by the encoder.

Figure 12:
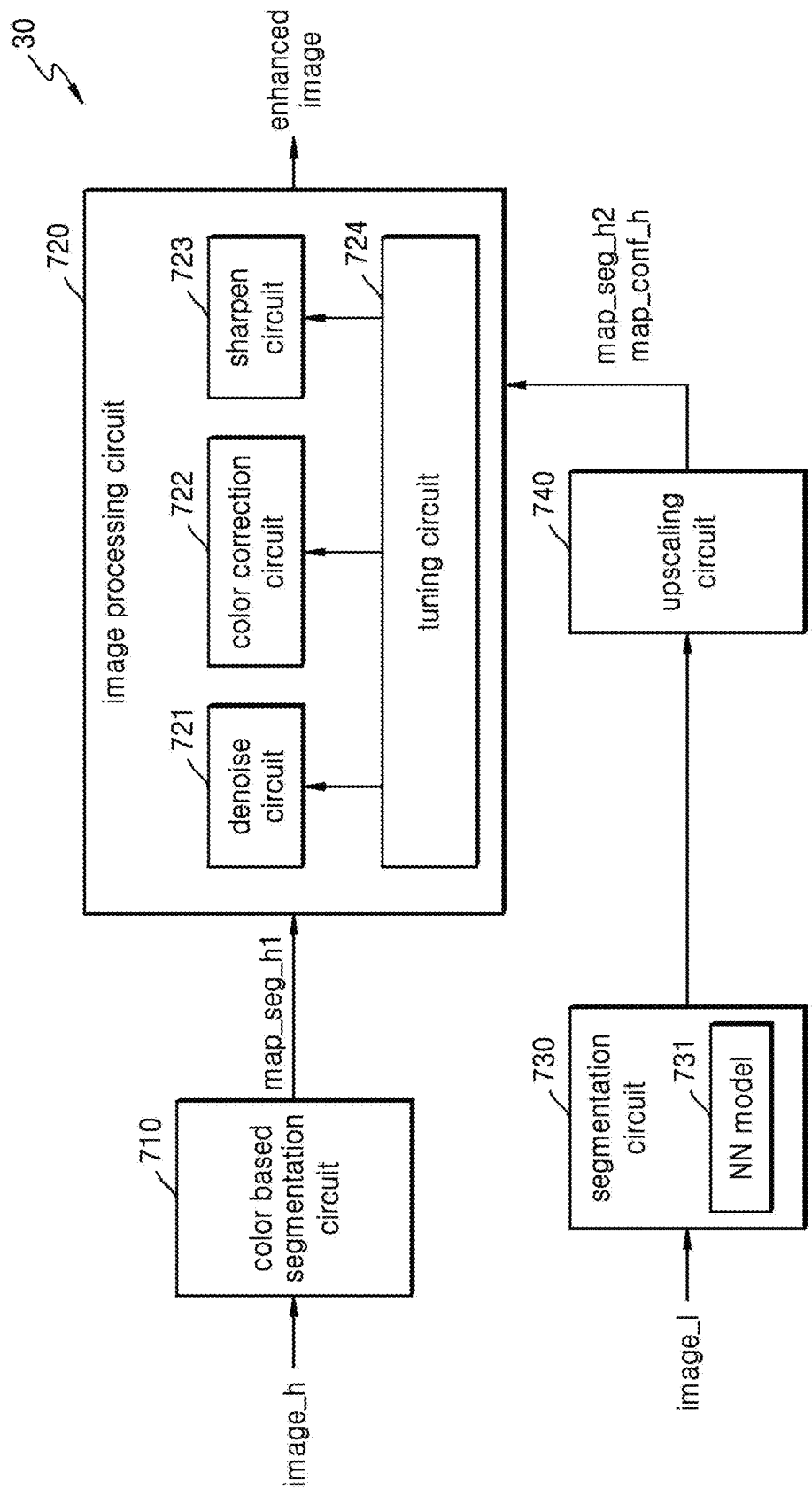
FIG. 12 is a block diagram showing an image processing system according to an example embodiment.

FIG. 12 is a block diagram showing an image processing system according to an example embodiment. Since an image processing system 30 of FIG. 12 is similar to the image processing system 10 of FIG. 1, descriptions identical to those already given above will be omitted. For example, the image processing circuit 720 may be substantially similar to the image processing circuit 100. The denoise circuit 721 may be substantially the same as the denoise circuit 110. The color correction circuit 722 may be substantially the same as the color correction circuit 120. The sharpen circuit 723 may be substantially the same as the sharpen circuit 130. The tuning circuit 724 may be substantially the same as the tuning circuit 140.

Unlike the image processing system 10 of FIG. 1, the image processing system 30 of FIG. 12 may further include a scene detection circuit 710. The scene detection circuit 710 according to an example embodiment may determine a scene representing the image image_h. For example, the scene representing the image image_h may be determined as food, a landscape, persons, etc. The scene detection circuit 710 (color based segmentation circuit) may use various algorithms to determine the scene representing the image image_h. For example, a feature point extraction algorithm, a face recognition algorithm, a color-based segmentation algorithm, etc. may be used.

The scene detection circuit 710 may generate correction effects and correction values according to a determined scene. Information including the correction effects and correction values generated by the scene detection circuit 710 may be referred to as sub-correction information. The scene detection circuit 710 may provide sub-correction information to an image processing circuit 720. The image processing circuit 720 may apply correction effects to the image image_h based on the sub-correction information. In addition, the scene detection circuit 710 may be implemented by hardware, software (or firmware), or a combination of hardware and software for carrying out the technical spirit. In this case, the scene detection circuit 710 may be included in an ISP.

As described above with reference to FIG. 1, a segmentation map map_seg_h and a confidence map map_conf_h may be generated through a segmentation circuit 730 and an upscaling circuit 740. The confidence map map_conf_h may include a probability and/or a confidence for each pixel of the segmentation map map_seg_h.

The image processing circuit 720 may receive the sub-correction information from the scene detection circuit 710 and may receive the segmentation map map_seg_h and the confidence map map_conf_h from the upscaling circuit 740.

The image processing circuit 720 may correct the image image_h based on the sub-correction information and correct the image image_h based on the segmentation map map_seg_h and the confidence map map_conf_h. The two correction operations may be performed in parallel or sequentially. An enhanced image may be produced as a result of the correction operations.

For example, a tuning circuit 724 may determine a class for each pixel of the image image_h based on the segmentation map map_seg_h and the confidence map map_conf_h and determine correction effects and correction values to be applied to each pixel. The tuning circuit 724 may generate a correction map including correction effects and correction values.

At least one of correcting circuits 721, 722, and 723 may correct the image image_h based on the sub-correction information. Next, the image image_h may be corrected based on the correction map generated by the tuning circuit 724. For example, the at least one of the correcting circuits 721, 722, and 723 may correct the entire image image_h by using the sub-correction information and correct each pixel of the image image_h based on the correction map.

Figure 13:
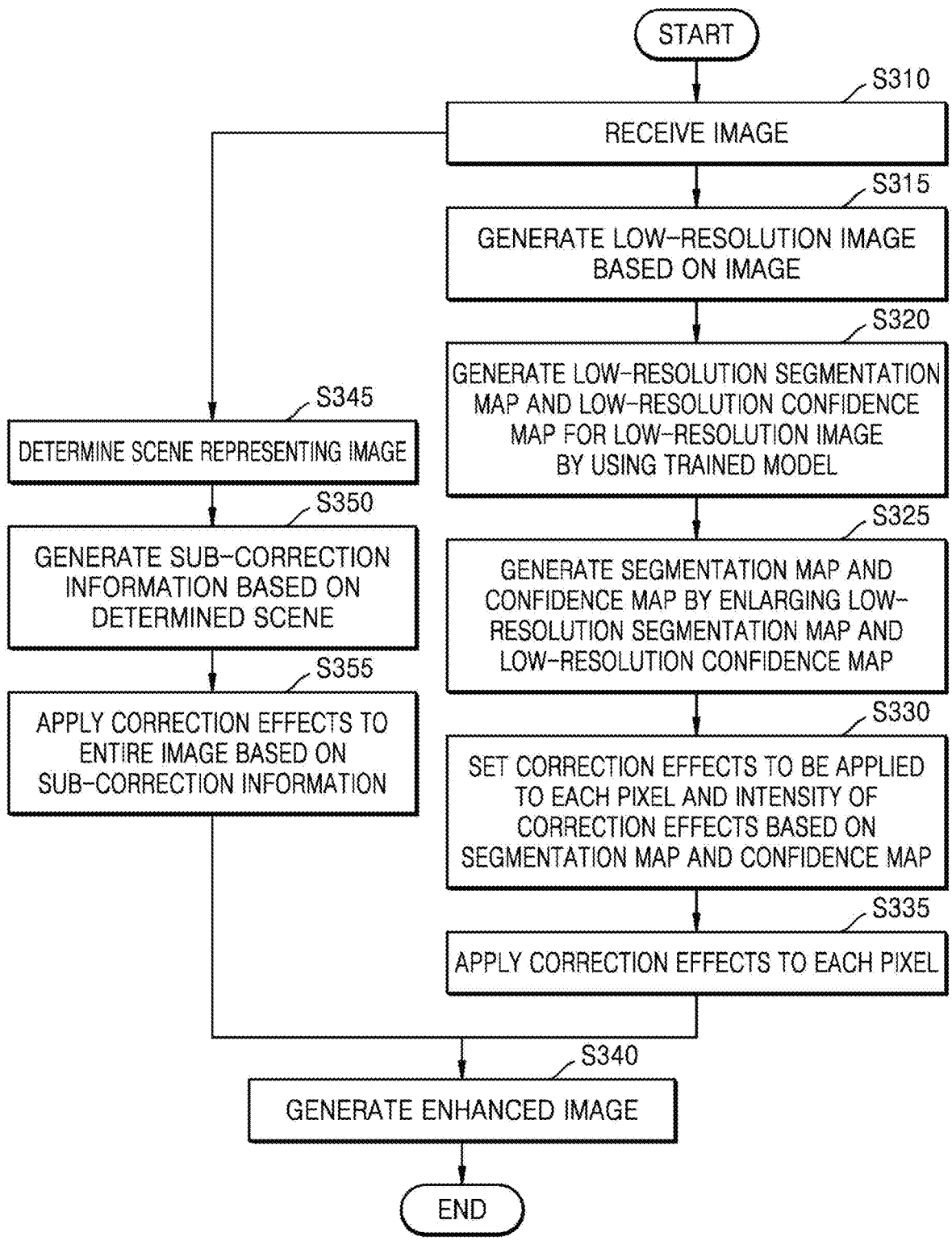
FIG. 13 is a flowchart showing an operation of an image processing system according to an example embodiment.

FIG. 13 is a flowchart showing an operation of an image processing system according to an example embodiment.

Referring to FIGS. 12 and 13 together, an operation of receiving an image image_h may be performed (operation S310). A low-resolution image image_l may be generated based on the image image_h (operation S315). By using the trained neural network model 731, a low-resolution segmentation map map_seg_l and a low-resolution confidence map map_conf_l for the low-resolution image image_l may be generated (operation S320). By enlarging the low-resolution segmentation map map_seg_l and the low-resolution confidence map map_conf_l, the segmentation map map_seg_h and the confidence map map_conf_h for the image image_h may be generated (operation S325). Based on the segmentation map map_seg_h and the confidence map map_conf_h, correction effects to be applied to each pixel of the image image_h and correction values may be determined (operation S330). Correction effects corresponding to the correction values may be applied to each pixel (operation S335).

A scene representing the image image_h may be determined (operation S345). Based on a determined scene, sub-correction information for the image image_h may be generated (operation S350). Based on the sub-correction information, correction effects may be applied to the entire image image_h (operation S355).

Operations S345 to S355 may be performed in parallel or sequentially with operations S315 to S335.

Figure 14:
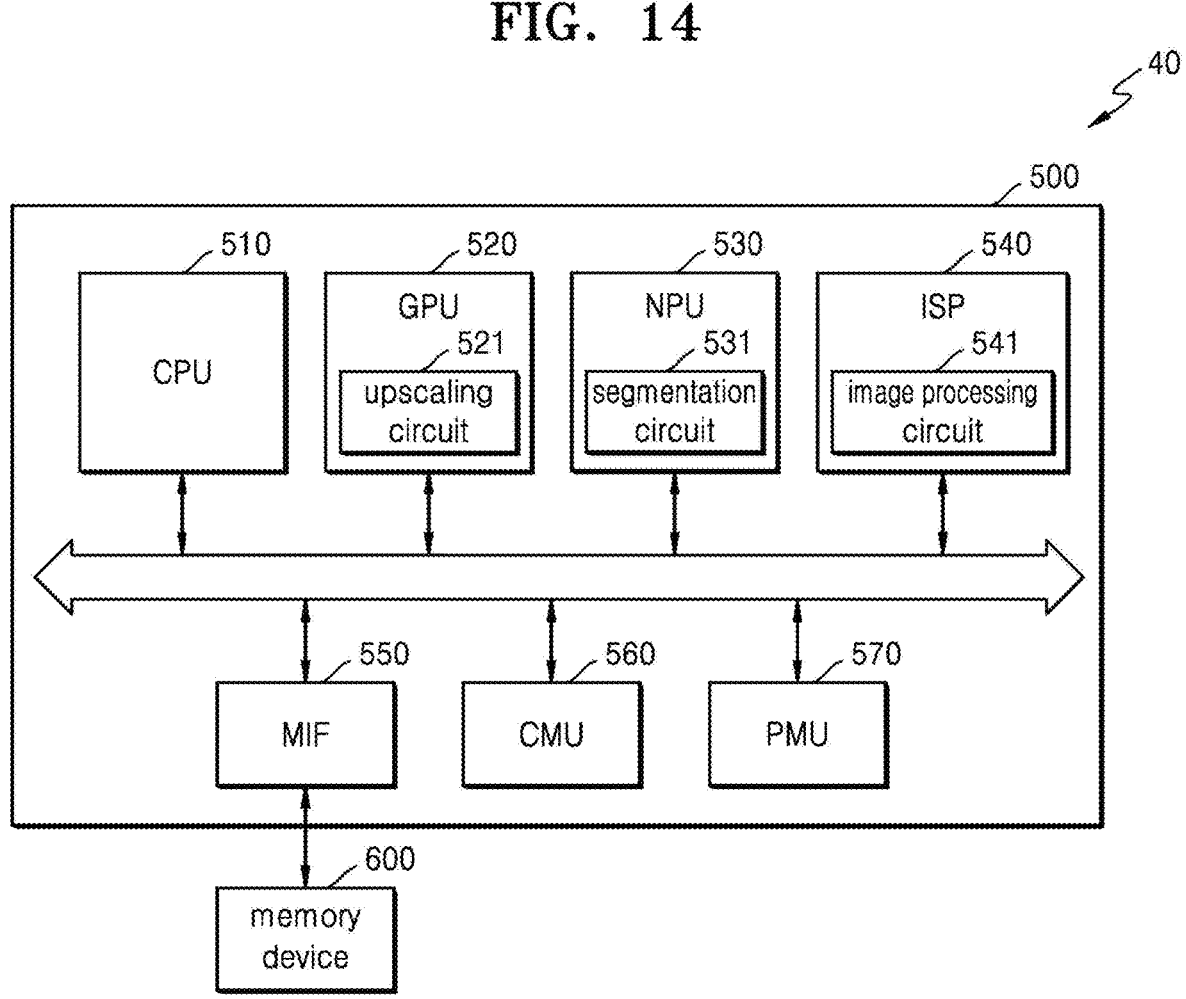
FIG. 14 is a block diagram showing a system according to an example embodiment.

FIG. 14 is a block diagram showing a system according to an example embodiment.

Referring to FIG. 14, a system 40 may be implemented as a handheld device like a mobile phone, a smartphone, a tablet computer, a personal digital assistant (PDA), an enterprise digital assistant (EDA), a digital still camera, a digital video camera, a portable multimedia player (PMP), a personal navigation device (PDN), a handheld game console, or an e-book.

The system 40 may include a system-on-chip (SoC) 500 and a memory device 600. The SoC 500 may include a central processing unit (CPU) 510, a graphics processing unit (GPU) 520, a neural processing unit (NPU) 530, an ISP 540, a memory interface (MIF) 550, a clock management unit (CMU) 560, and a power management unit (PMU) 570. The CPU 510, the GPU 520, the NPU 530, and the ISP 540 may be referred to as master IP devices, and the MIF 550 may be referred to as a slave IP device.

At least one of the CPU 510, the GPU 520, the NPU 530, and the ISP 540 may include the image processing systems 10, 20, or 30 described above with reference to FIGS. 1 to 13. The components of the image processing system 10, 20, or 30 may be implemented in the same IP device or at least one component may be implemented in another IP device. According to an embodiment, the GPU 520 may include an upscaling circuit 521, the NPU 530 may include a segmentation circuit 531, and the ISP 540 may include an image processing circuit 541.

For example, the ISP 540 may generate an image to be corrected, generate a low-resolution image for the image to be corrected, and provide the low-resolution image to the NPU 530. The segmentation circuit 531 of the NPU 530 may generate a low-resolution segmentation map and a low-resolution confidence map and provide the low-resolution segmentation map and the low-resolution confidence map to the GPU 520. The upscaling circuit 521 of the GPU 520 may generate a segmentation map and a confidence map and may provide the segmentation map and the confidence map back to the ISP 540. The image processing circuit 541 of the ISP 540 may generate an enhanced image by performing pixel-by-pixel corrections on the image based on the segmentation map and the confidence map.

The CPU 510 may process or execute instructions and/or data stored in the memory device 600 in response to a clock signal generated by the CMU 560.

The GPU 520 may obtain image data stored in the memory device 600 in response to the clock signal generated by the CMU 560. The GPU 520 may generate data for an image to be output through a display device (not shown) from image data provided by the MIF 550 or may encode the image data.

The NPU 530 may refer to any device for executing a machine learning model. The NPU 530 may be a hardware block designed to execute a machine learning model. The machine learning model may be a model based on an artificial neural network, a decision tree, a support vector machine, a regression analysis, a Bayesian network, a genetic algorithm, etc. As a non-limiting example, an artificial neural network may include a CNN, an R-CNN, an RPN, an RNN, an S-DNN, an S-SDNN, a deconvolution network, a DBN, an RBM, a fully convolutional network, an LSTM network, and a classification network.

The ISP 540 may perform a signal processing operation on raw data received from an image sensor (not shown) located outside the SoC 500 and generate digital data having improved image quality.

The MIF 550 may provide an interface for the memory device 600 located outside the SoC 500. The memory device 600 may be dynamic random access memory (DRAM), phase-change random access memory (PRAM), resistive random access memory (ReRAM), or flash memory.

The CMU 560 may generate a clock signal and provide the clock signal to components of the SoC 500. The CMU 560 may include a clock generator like a phase locked loop (PLL), a delayed locked loop (DLL), and a crystal. The PMU 570 may convert external power into internal power and supply power to the components of the SoC 500 from the internal power.

The SoC 500 may further include a volatile memory. The volatile memory may be implemented as DRAM, SRAM, etc. The volatile memory may store various programs and data for the operations of the image processing circuit 541, the segmentation circuit 531, and the upscaling circuit 521 and store data generated by the image processing circuit 541, the segmentation circuit 531, and the upscaling circuit 521. According to an embodiment, the volatile memory may store a low-resolution segmentation map and a low-resolution confidence map or may store a segmentation map and a confidence map.

According to an example embodiment, each of at least one correcting circuit of the image processing circuit 541 may access the volatile memory through direct memory access (DMA). To this end, the SoC 500 may further include an access device like a DMA controller, a memory DMA (MDMA), a peripheral DMA (PDMA), a remote DMA (RDMA), a smart DMA (SDMA), etc.

Figure 15:
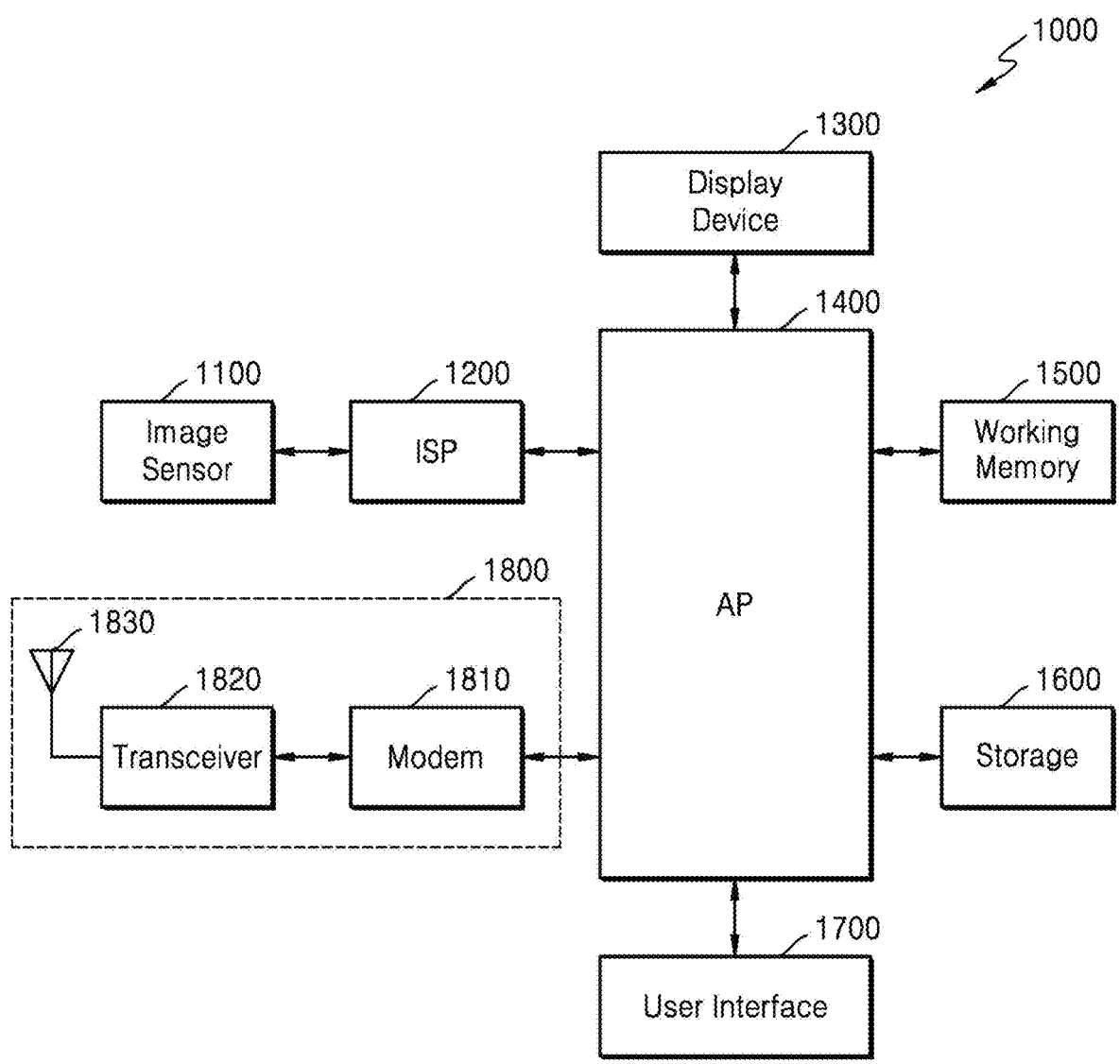
FIG. 15 is a block diagram of an electronic device according to an example embodiment.

FIG. 15 is a block diagram of an electronic device according to an example embodiment.

Referring to FIG. 15, an electronic device 1000 according to an example embodiment may include an image sensor 1100, an ISP 1200, a display device 1300, an application processor (AP) 1400, a working memory 1500, a storage 1600, a user interface 1700, and a wireless transceiver 1800, wherein the ISP 1200 may be implemented as a separate integrated circuit from the AP 1400.

According to an example embodiment, the image processing system 10, 20, or 30 described above with reference to FIGS. 1 to 13 may be implemented on the ISP 1200 and/or the AP 1400. For example, an image processing circuit may be implemented on the ISP 1200, and the remaining components may be implemented on the AP 1400.

The image sensor 1100 may generate image data, such as raw image data, based on a received optical signal, and provide binary data to the ISP 1200. The AP 1400 controls the overall operation of the electronic device 1000 and may be implemented as a system-on-chip (SoC) that drives an application program, an operating system, etc. The AP 1400 may control the operation of the ISP 1200 and provide converted image data generated by the ISP 1200 to the display device 1300 or store the converted image data in the storage 1600.

The working memory 1500 may store programs and/or data processed or executed by the AP 1400. The storage 1600 may be implemented with a non-volatile memory device like a NAND flash or a resistive memory. For example, the storage 1600 may be provided as a memory card (a multimedia card (MMC), an embedded multimedia card (eMMC), a secure digital (SD) card, a micro SD card, etc.). The storage 1600 may store data and/or programs regarding an execution algorithm that controls an image processing operation of the ISP 1200, and, when an image processing operation is performed, the data and/or the programs may be loaded to the working memory 1500.

The user interface 1700 may be implemented with various devices capable of receiving user inputs, e.g., a keyboard, a curtain key panel, a touch panel, a fingerprint sensor, a microphone, etc. The user interface 1700 may receive a user input and provide a signal corresponding to the received user input to the AP 1400. The wireless transceiver 1800 may include a modem 1810, a transceiver 1820, and an antenna 1830.

Additionally, the image processing system 100 and/or the components included therein may include and/or be included in processing circuitry such as hardware including logic circuits; a hardware/software combination such as a processor executing software; or a combination thereof. For example, the processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While the inventive concepts has been particularly shown and described with reference to embodiments thereof, it will be understood that various changes in form and details may be made therein without departing from the spirit and scope of the following claims.

What is claimed is:

1. An image processing circuit comprising:
   a tuning circuit configured to:
   receive a segmentation map comprising pixel-by-pixel class inference information of a first image and a confidence map comprising confidence of the class inference information,
   determine classes of respective pixels of the first image, correction effects for each pixel of the first image, and correction values indicating intensity of the correction effects based on the segmentation map and the confidence map, and
   generate a correction map based on the classes and the correction values of the respective pixels; and
   at least one correcting circuit configured to generate an enhanced image by applying correction effects according to the correction values to the respective pixels of the first image based on the correction map, wherein
   the segmentation map is generated by enlarging a low-resolution segmentation map,
   the confidence map is generated by enlarging a low-resolution confidence map, and
   each of the low-resolution segmentation map and the low-resolution confidence map is generated using a lower resolution version of the first image.

2. The image processing circuit of claim 1, wherein the tuning circuit comprises:
   a select circuit configured to determine a class of each pixel based on the segmentation map, the confidence map, and a pre-set threshold value;
   a configuration table comprising at least one correction effect and an intensity of each of the at least one correction effect, the at least one correction effect being based on the class of each pixel and a confidence of the class of each pixel; and
   a mix circuit configured to determine correction effects to be applied to each pixel and the correction values, based on the configuration table, and generate a correction map for the correction effects.

3. The image processing circuit of claim 2, wherein the at least one correcting circuit comprises at least one of a denoise circuit, a color correction circuit, and a sharpen circuit.

4. The image processing circuit of claim 3, wherein the mix circuit generates a first correction map for a denoise effect and provides the first correction map to the denoise circuit, generates a second correction map for a color correction effect and provides the second correction map to the color correction circuit, and generates a third correction map for a sharpening effect and provides the third correction map to the sharpen circuit.

5. The image processing circuit of claim 1, wherein the segmentation map and the confidence map are generated by a neural network model trained by using an arbitrary pixel and a correct answer class labeled in correspondence to the arbitrary pixel.

6. The image processing circuit of claim 5, wherein the segmentation map and the confidence map are generated by an upscaling circuit, and
   the low-resolution segmentation map and the low-resolution confidence map are generated by the neural network model by using the lower resolution version of the first image.

7. The image processing circuit of claim 5, wherein each pixel of the segmentation map represents the class of a respective pixel of the first image, wherein each pixel of the segmentation map includes a value with n bits, and
   each pixel of the confidence map represents confidence of the class of a respective pixel of the first image, wherein each pixel of the confidence map includes a value with m bits, wherein a value of m is greater than a value of n.

8. The image processing circuit of claim 1, wherein each pixel of the segmentation map includes least one of a face class, a skin class, a sky class, a detail class, an eye class, an eyebrow class, and a hair class.

9. The image processing circuit of claim 8, wherein the detail class includes at least one of a grass class, a sand class, and a branch class.

10. The image processing circuit of claim 1, wherein the image processing circuit is included in an image signal processor (ISP).

11. A system-on-chip (SoC) for generating an enhanced image by correcting a first image, the SoC comprising:
    a first circuit configured to generate first class inference information for each pixel of the first image and a first confidence for the respective first class inference information by using a trained neural network model; and
    a second circuit configured to a determine correction value for each respective pixel of the first image based on the respective first class inference information and the respective first confidence for each pixel and generate the enhanced image by applying correction effects corresponding to the respective correction values to the respective pixels of the first image, wherein
    the first class inference information is generated by interpolating a second class inference information for each pixel of a low-resolution image,
    the first confidence is generated by interpolating a second confidence for each respective second class inference information, and
    the low resolution image is a lower resolution version of the first image.

12. The SoC of claim 11, wherein
    the first circuit receives the low-resolution image for the first image and generates the second class inference information for each respective pixel of the low-resolution image by using the trained neural network model and a second confidence for each respective second class inference information, and
    the first circuit further comprises a third circuit configured to generate the first class inference information for each pixel of the first image and the first confidence for each respective first class inference information based on the second class inference information and the second confidence.

13. The SoC of claim 12, wherein the third circuit generates the first class inference information and the first confidence.

14. The SoC of claim 12, wherein the second circuit generates the low-resolution image by using the first image and provides the low-resolution image to the first circuit.

15. The SoC of claim 12, wherein the third circuit is included in an image signal processor (ISP).

16. The SoC of claim 11, wherein the trained neural network model is configured to learn relationships between a plurality of classes classified to have different correction effects and pixels.

17. The SoC of claim 11, wherein the first circuit further comprises a third circuit configured to determine a scene representing the first image and generate sub-correction information corresponding to the scene,
wherein the second circuit corrects the first image based on the sub-correction information and corrects each pixel of the first image based on the correction values.

18. The SoC of claim 17, wherein the second circuit and the third circuit are included in an image signal processor (ISP).

19. A system-on-chip (SoC) for correcting a first image, the SoC comprising:
a segmentation circuit configured to receive the first image and generate a segmentation map comprising class inference information corresponding to each pixel of the first image and a confidence map comprising confidence for the class inference information for each respective pixel of the first image by using a trained neural network model; and
an image processing circuit configured to generate a correction map by determining correction effects to be applied to each pixel of the first image based on the segmentation map and the confidence map and apply the correction effects to the first image based on the correction map, wherein
the segmentation map is generated by enlarging a low-resolution segmentation map,
the confidence map is generated by enlarging a low-resolution confidence map, and
each of the low-resolution segmentation map and the low-resolution confidence map is generated using a lower resolution version of the first image.

20. The SoC of claim 19, wherein, to apply a first correction effect to a first region comprising a first pixel classified as a first class in the first image, the image processing circuit uses at least one of a denoise circuit configured to reduce noise in the first region, a color correction circuit configured to adjust a color value of the first region, and a sharpen circuit configured to increase sharpness of the first region.

* * * * *